US010047819B2

(12) United States Patent
Ueki

(10) Patent No.: US 10,047,819 B2
(45) Date of Patent: Aug. 14, 2018

(54) VIBRATION-DAMPING DEVICE

(71) Applicant: BRIDGESTONE CORPORATION, Tokyo (JP)

(72) Inventor: Akira Ueki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/305,539

(22) PCT Filed: Apr. 20, 2015

(86) PCT No.: PCT/JP2015/061982
§ 371 (c)(1),
(2) Date: Oct. 20, 2016

(87) PCT Pub. No.: WO2015/166830
PCT Pub. Date: Nov. 5, 2015

(65) Prior Publication Data
US 2017/0045108 A1 Feb. 16, 2017

(30) Foreign Application Priority Data

Apr. 30, 2014 (JP) ................. 2014-094083

(51) Int. Cl.
*F16F 13/10* (2006.01)
*B60K 5/12* (2006.01)

(52) U.S. Cl.
CPC .......... *F16F 13/107* (2013.01); *B60K 5/1208* (2013.01); *F16F 13/10* (2013.01)

(58) Field of Classification Search
CPC ...... F16F 9/05; F16F 9/437; F16F 9/50; F16F 9/34; F16F 13/002; F16F 13/105; F16F 13/08; F16F 13/107; F16F 2230/24
(Continued)

(56) References Cited

U.S. PATENT DOCUMENTS 4,618,128 A * 10/1986 Hartel ................ F16F 13/107
  188/320
4,651,980 A * 3/1987 Morita ................ F16F 13/106
  267/140.13
(Continued)

FOREIGN PATENT DOCUMENTS

CN   102414472 A   4/2012
EP     1426650 A1   6/2004
(Continued)

OTHER PUBLICATIONS

Communication dated May 3, 2017 from the European Patent Office in counterpart European application No. 15786726.8.
(Continued)

*Primary Examiner* — Thomas W Irvin
(74) *Attorney, Agent, or Firm* — Sughrue Mion, PLLC

(57) ABSTRACT

A vibration-damping device (10) includes a first attachment member (11), a second attachment member (12), an elastic body (13), and a partitioning member (16). Limiting passages (31, 32) are formed in the partitioning member (16), and the limiting passages (31, 32) include a first limiting passage (31) and a second limiting passage (32). An inner peripheral surface of the first limiting passage (31) is provided with flow changing protrusions (33, 34) that protrude toward an inner side in a radial direction of the first limiting passage (31) and that changes the flow of a liquid (L) that flows through the first limiting passage (31) in an axial direction of the first limiting passage (31). In a vertical cross-sectional view passing through an axis of the first limiting passage (31) and through the flow changing protrusions (33, 34), the first limiting passage (31) and the flow changing protrusion1 (33, 34) have symmetrical shapes with respect to the axis. Protruding ends of the flow changing protrusions (33, 34) form inner peripheral edges of passage
(Continued)

holes (33c, 34c) that are open on both sides in the axial direction.

20 Claims, 6 Drawing Sheets

(58) Field of Classification Search
USPC ........................................ 267/140.11, 140.13
See application file for complete search history.

(56) References Cited

U.S. PATENT DOCUMENTS

| | | | | |
|---|---|---|---|---|
| 4,676,489 A * | 6/1987 | Hofmann | .............. | F16F 13/107 |
| | | | | 267/122 |
| 4,739,962 A * | 4/1988 | Morita | ...................... | F16F 9/34 |
| | | | | 267/140.13 |
| 4,739,978 A * | 4/1988 | Bodin | ................... | F16F 13/107 |
| | | | | 188/320 |
| 4,898,020 A | 2/1990 | Vassiliou | | |
| 5,645,138 A * | 7/1997 | Tajima | ................... | F16F 13/16 |
| | | | | 180/300 |
| 6,409,158 B1 * | 6/2002 | Takashima | ............ | F16F 13/101 |
| | | | | 267/140.13 |
| 6,439,554 B1 * | 8/2002 | Takashima | .............. | F16F 13/26 |
| | | | | 267/140.13 |
| 6,585,242 B2 * | 7/2003 | Kodama | ................. | F16F 13/26 |
| | | | | 267/140.13 |
| 9,222,541 B2 * | 12/2015 | Kanaya | ................. | F16F 13/106 |
| 2012/0080829 A1 | 4/2012 | Sugawara | | |
| 2016/0131219 A1 * | 5/2016 | Ueki | ..................... | F16F 13/107 |
| | | | | 267/140.13 |
| 2016/0160956 A1 * | 6/2016 | Ueki | ..................... | F16F 13/107 |
| | | | | 267/140.13 |
| 2016/0245364 A1 * | 8/2016 | Ueki | ..................... | F16F 13/107 |
| 2016/0281814 A1 * | 9/2016 | Ueki | ..................... | F16F 13/107 |
| 2016/0298716 A1 * | 10/2016 | Ueki | ..................... | F16F 13/107 |
| 2017/0016508 A1 * | 1/2017 | Ueki | ....................... | F16F 13/10 |
| 2017/0023089 A1 * | 1/2017 | Ueki | ..................... | F16F 13/105 |
| 2017/0023090 A1 * | 1/2017 | Ueki | ....................... | F16F 13/10 |
| 2017/0023091 A1 * | 1/2017 | Ueki | ....................... | F16F 13/10 |
| 2017/0030428 A1 * | 2/2017 | Ueki | ..................... | B60K 5/1208 |
| 2017/0037924 A1 * | 2/2017 | Ueki | ....................... | F16F 13/10 |
| 2017/0089421 A1 * | 3/2017 | Ueki | ....................... | F16F 13/10 |
| 2017/0167564 A1 * | 6/2017 | Ueki | ..................... | F16F 13/107 |

FOREIGN PATENT DOCUMENTS

| | | |
|---|---|---|
| EP | 2 110 576 A2 | 10/2009 |
| EP | 2420697 A1 | 2/2012 |
| EP | 3070365 A1 | 9/2016 |
| GB | 2 154 699 A | 9/1985 |
| JP | 58-18143 U | 2/1983 |
| JP | 60-184737 A | 9/1985 |
| JP | 02-071141 A | 3/1990 |
| JP | 2-71141 U | 5/1990 |
| JP | 2007-120598 A | 5/2007 |
| JP | 2007-218335 A | 8/2007 |
| JP | 2008-175321 A | 7/2008 |
| JP | 2009-150451 A | 7/2009 |
| JP | 2009236143 A | 10/2009 |
| JP | 2009-275910 A | 11/2009 |

OTHER PUBLICATIONS

Communication dated Jan. 4, 2018, from the State Intellectual Property Office of People's Republic of China in counterpart Application No. 2015800228010.

* cited by examiner

VIBRATION-DAMPING DEVICE

CROSS REFERENCE TO RELATED APPLICATIONS

This application is a National Stage of International Application No. PCT/JP2015/061982 filed Apr. 20, 2015, claiming priority based on Japanese Patent Application No. 2014-094083 filed Apr. 30, 2014, the contents of all of which are incorporated herein by reference in their entirety.

TECHNICAL FIELD

The present invention relates to a vibration-damping device that is applied to, for example, automobiles, industrial machines, or the like, and absorbs and damps vibrations of vibration generating parts, such as engines.

Priority is claimed on Japanese Patent Application No. 2014-094083, filed on Apr. 30, 2014, the content of which is incorporated herein by reference.

BACKGROUND ART

Conventionally, as this type of vibration-damping device, for example, a configuration described in Patent Document 1 is known. This vibration-damping device includes a tubular first attachment member that is coupled to any one of a vibration generating part and a vibration receiving part, a second attachment member that is coupled to the other thereof, an elastic body that couples the first attachment member and the second attachment member together, and a partitioning member that partitions a liquid chamber within the first attachment member having a liquid enclosed therein into a first liquid chamber and a second liquid chamber. A limiting passage that allows the first liquid chamber and the second liquid chamber to communicate with each other is formed in the partitioning member. The limiting passage includes a first limiting passage that causes resonance with respect to the input of an idle vibration, and a second limiting passage that causes resonance with respect to the input of a shake vibration. The partitioning member is provided with a plunger member.

In this vibration-damping device, the limiting passage through which a liquid flows between the first liquid chamber and the second liquid chamber is switched by moving the plunger member to open and close the first limiting passage when vibration is input. Accordingly, the liquid flows through the first limiting passage when the idle vibration is input, and the liquid flows through the second limiting passage when the shake vibration is input.

CITATION LIST

Patent Document

[Patent Document 1] Japanese Unexamined Patent Application, First Publication No. 2007-120598

SUMMARY OF INVENTION

Technical Problem

However, in the above related-art vibration-damping device, there is room for improvement in suppression of abnormal noise generated when the plunger member moves, simplification of structure, and facilitation of manufacture.

The present invention is made in view of the aforementioned circumstances, and an object thereof is to provide a vibration-damping device that can suppress generation of abnormal noise and achieve simplification of structure and facilitation of manufacture.

Solution to Problem

A first aspect of the present invention is a vibration-damping device which includes a tubular first attachment member coupled to any one of a vibration generating part and a vibration receiving part, and a second attachment member coupled to the other thereof; an elastic body that couples the first attachment member and the second attachment member together; and a partitioning member that partitions a liquid chamber within the first attachment member having a liquid enclosed therein into a first liquid chamber and a second liquid chamber. At least one of the first liquid chamber and the second liquid chamber has the elastic body on a portion of a wall surface thereof. A limiting passage that allows the first liquid chamber and the second liquid chamber to communicate with each other is formed in the partitioning member. The limiting passage includes a first limiting passage that causes resonance with respect to the input of an idle vibration, and a second limiting passage that causes resonance with respect to the input of a shake vibration. An inner peripheral surface of the first limiting passage is provided with a flow changing protrusion that protrudes toward an inner side in a radial direction of the first limiting passage and that changes the flow of a liquid that flows through the first limiting passage in an axial direction of the first limiting passage. In a vertical cross-sectional view passing through an axis of the first limiting passage and through the flow changing protrusion, the first limiting passage and the flow changing protrusion have symmetrical shapes with respect to the axis. A protruding end of the flow changing protrusion forms an inner peripheral edge of a passage hole that is open on both sides in the axial direction.

Advantageous Effects of Invention

According to the vibration-damping device related to the present invention, generation of abnormal noise can be suppressed and simplification of structure and facilitation of manufacture can be achieved.

DESCRIPTION OF EMBODIMENTS

First Embodiment

A first embodiment of a vibration-damping device related to the present invention will be described below, referring to FIGS. 1 to 3.

Figure 1:
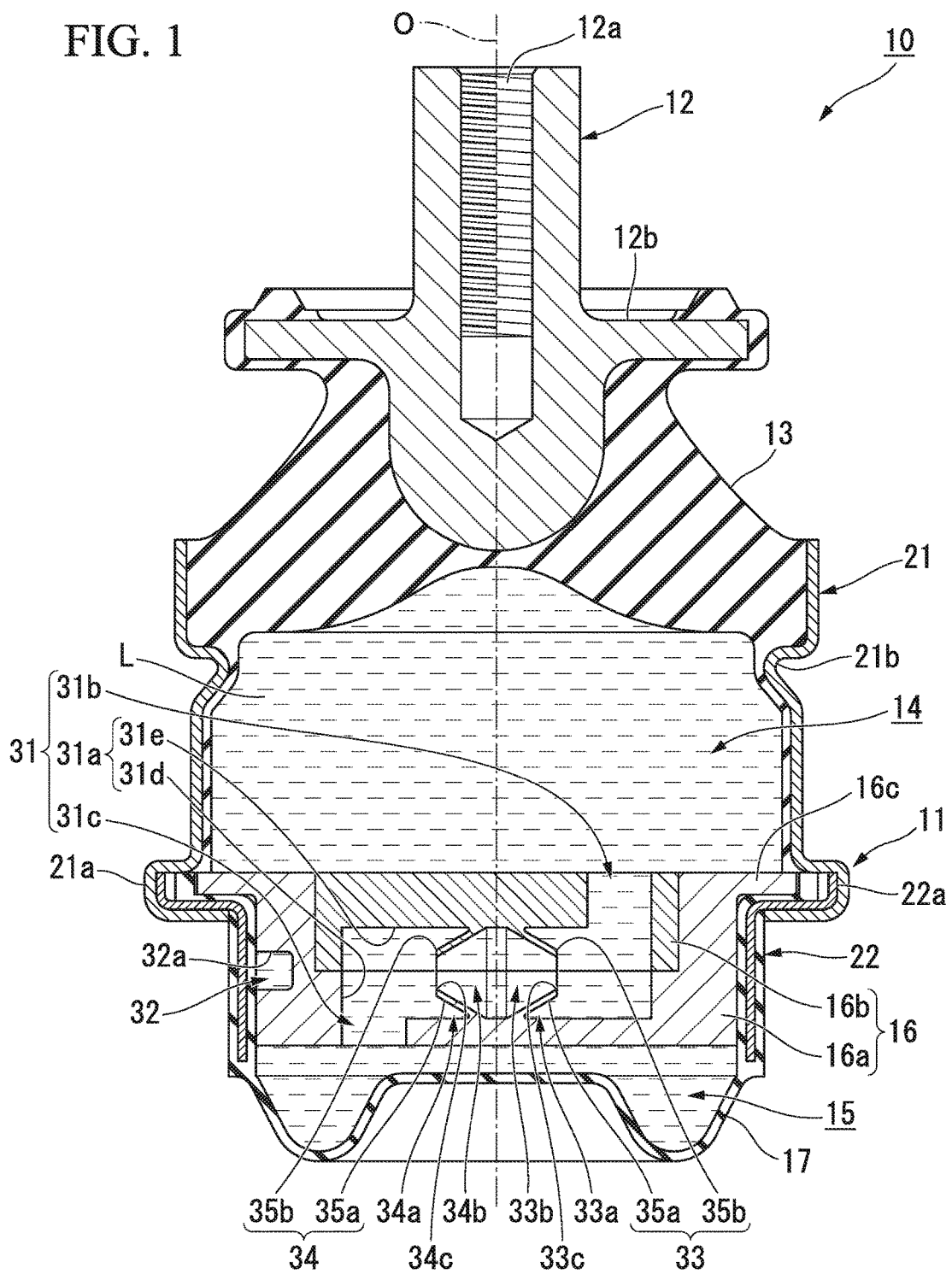
FIG. 1 is a longitudinal sectional view of a vibration-damping device related to a first embodiment of the present invention.

The vibration-damping device 10, as shown in FIG. 1, includes a tubular first attachment member 11 that is coupled to any one of a vibration generating part and a vibration receiving part, a second attachment member 12 that is coupled to the other thereof, an elastic body 13 that couples the first attachment member 11 and the second attachment member 12 together, and a partitioning member 16 that partitions a liquid chamber within the first attachment member 11 in which a liquid L is enclosed, into a main liquid chamber (first liquid chamber) 14 that has the elastic body 13 in a portion of a wall surface thereof, and an auxiliary liquid chamber (second liquid chamber) 15.

In FIG. 1, the second attachment member 12 is formed in a columnar shape, the elastic body 13 is formed in a tubular shape, and the first attachment member 11, the second attachment member 12, and the elastic body 13 are disposed coaxially with a common axis. Hereinafter, this common axis is referred to as an axis O (an axis of the first attachment member), a main liquid chamber 14 side in a direction of the axis O is referred to as a first side, an auxiliary liquid chamber 15 side is referred to as a second side, a direction orthogonal to the axis O is referred to as a radial direction, and a direction going around the axis O is referred to as a circumferential direction.

In addition, in a case where the vibration-damping device 10 is mounted on, for example, an automobile, the second attachment member 12 is coupled to an engine serving as the vibration generating part and the first attachment member 11 is coupled to a vehicle body serving as the vibration receiving part via a bracket (not shown), whereby vibration of the engine is restrained from being transmitted to the vehicle body. The vibration-damping device 10 is of a liquid-enclosed type in which the liquid L, for example, such as ethylene glycol, water, or silicone oil, is enclosed in the above liquid chamber of the first attachment member 11.

The first attachment member 11 includes a first outer tube body 21 located on the first side in the direction of the axis O, and a second outer tube body 22 located on the second side in the direction of the axis O.

The elastic body 13 is coupled to a first end of the first outer tube body 21 in a liquid-tight state, and a first opening of the first outer tube body 21 is blocked by the elastic body 13. A second end 21a of the first outer tube body 21 is formed with a greater diameter than other portions. The inside of the first outer tube body 21 is the main liquid chamber 14. The liquid pressure of the main liquid chamber 14 fluctuates when the elastic body 13 is deformed and the internal volume of the main liquid chamber 14 changes at the time of the input of vibration.

In addition, an annular groove 21b that extends continuously over the entire circumference thereof is formed in the portion of the first outer tube body 21 that is connected from a second side thereof opposite to the portion thereof to which the elastic body 13 is coupled.

A diaphragm 17 is coupled to a second end of the second outer tube body 22 in a liquid-tight state, and a second opening of the second outer tube body 22 is blocked by the diaphragm 17. A first end 22a of the second outer tube body 22 is formed with a greater diameter than other portions, and is fitted into the second end 21a of the first outer tube body 21. Additionally, the partitioning member 16 is fitted into the second outer tube body 22, and the portion of the inside of the second outer tube body 22 between the partitioning member 16 and the diaphragm 17 is the auxiliary liquid chamber 15. The auxiliary liquid chamber 15 has the diaphragm 17 as a portion of a wall surface thereof, and is expanded and contracted when the diaphragm 17 is deformed. In addition, substantially the entire region of the second outer tube body 22 is covered by a rubber membrane formed integrally with the diaphragm 17.

A female thread part 12a is formed coaxially with the axis O in a first end surface of the second attachment member 12. The second attachment member 12 protrudes from the first attachment member 11 to the first side. A flange part 12b that protrudes toward an outer side in the radial direction and continuously extends over the entire circumference thereof is formed in the second attachment member 12. The flange part 12b is separated from a first end edge of the first attachment member 11 to the first side.

The elastic body 13 is formed of, for example, a rubber material or the like capable of being elastically deformed, and is formed in a tubular shape that has a gradually enlarged diameter from the first side toward the second side. A first end of the elastic body 13 is coupled to the second attachment member 12, and a second end thereof is coupled to the first attachment member 11.

In addition, substantially the entire region of an inner peripheral surface of the first outer tube body 21 of the first attachment member 11 is covered by the rubber membrane formed integrally with the elastic body 13.

The partitioning member 16 includes a body part 16a and a fitting part 16b. The body part 16a is formed in a bottomed tubular shape disposed coaxially with the axis O, and is fitted into the first attachment member 11. The body part 16a is provided with a flange part 16c that protrudes toward the outer side in the radial direction. The flange part 16c is provided at a first end of the body part 16a. The flange part 16c is disposed within the first end 22a of the second outer tube body 22.

The fitting part 16b is formed in a columnar shape disposed coaxially with the axis O, and is fitted into the body part 16a. An end surface of the fitting part 16b that faces the first side is flush with an end surface of the body part 16a that faces the first side.

In addition, the body part 16a and the fitting part 16b are respectively formed, for example, by injecting a synthetic resin material into a mold and removing the mold in the direction of the axis O.

Figure 2:
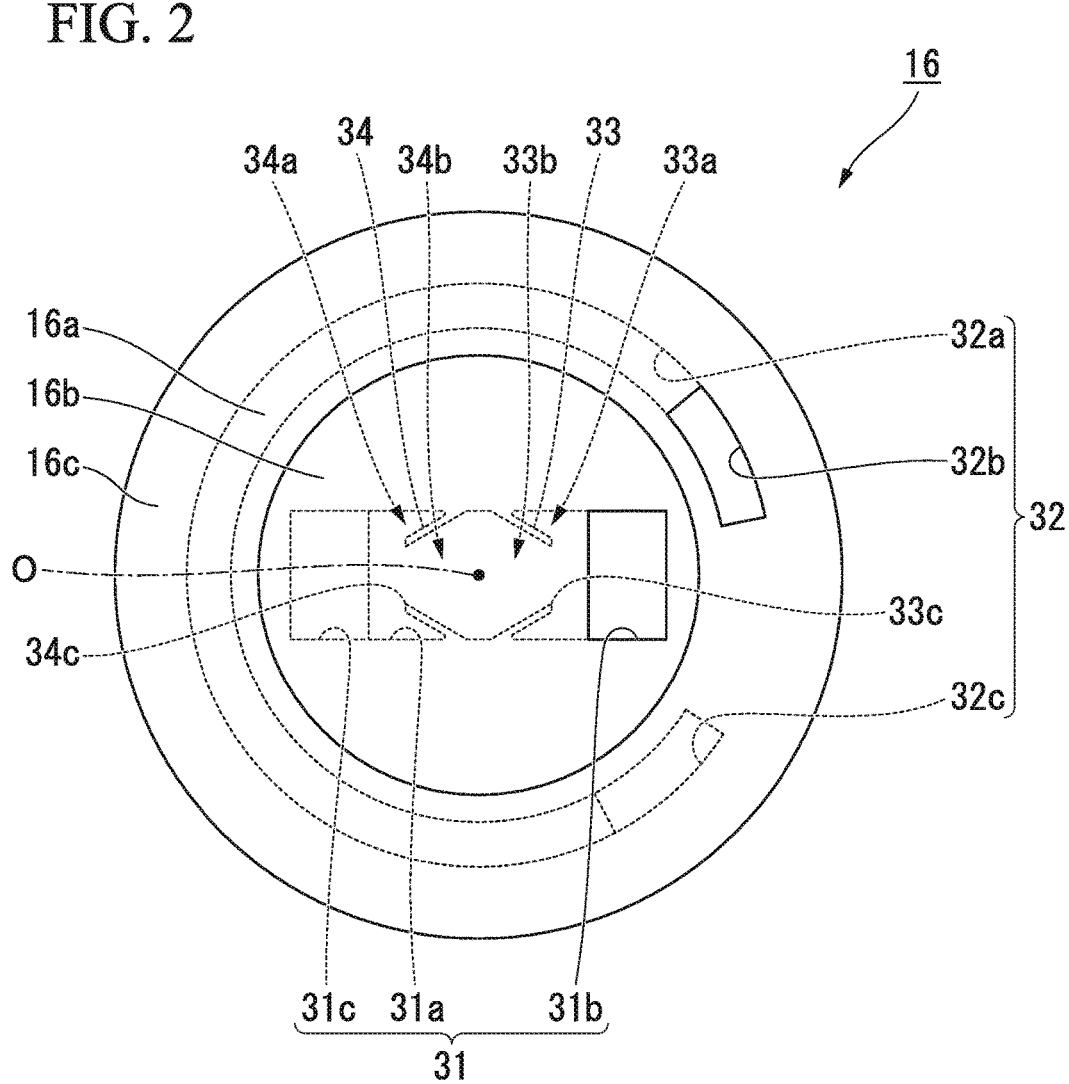
FIG. 2 is a partial sectional perspective view of a fitting part provided in a partitioning member that constitutes the vibration-damping device shown in FIG. 1.

As shown in FIGS. 1 and 2, the partitioning member 16 is provided with limiting passages 31 and 32 that allow the main liquid chamber 14 and the auxiliary liquid chamber 15 to communicate with each other. The limiting passages 31 and 32 are provided with a first limiting passage 31 (idle orifice) and a second limiting passage 32 (shake orifice).

The first limiting passage 31 causes liquid column resonance with respect to the input of an idle vibration (for example, a frequency of 18 Hz to 30 Hz and an amplitude of ±0.5 mm or less). The second limiting passage 32 causes liquid column resonance with respect to the input of a shake vibration (for example, a frequency of 14 Hz or less and an amplitude of greater than ±0.5 mm) having a lower frequency than the idle vibration.

The flow resistance of the first limiting passage 31 is smaller than the flow resistance of the second limiting passage 32, and the liquid L flows through the first limiting passage 31 more actively than the second limiting passage 32 in a state where the main liquid chamber 14 and the auxiliary liquid chamber 15 communicate with each other through the first limiting passage 31.

The first limiting passage 31 and the second limiting passage 32 are independent from each other within the partitioning member 16, and a flow passage is not made to serve a double purpose.

The first limiting passage 31 includes a body passage part 31a, a main passage part 31b, and an auxiliary passage part 31c.

The body passage part 31a is formed in a columnar shape at a central part of the partitioning member 16 in the direction of the axis O. A central axis (hereinafter referred to as a "flow passage axis") M of the body passage part 31a is orthogonal to the axis O, and extends on a boundary surface between a bottom part of the body part 16a of the partitioning member 16 and the fitting part 16b along this boundary surface.

The body passage part 31a is constituted of a first groove part 31d formed in the body part 16a, and a second groove part 31e formed in the fitting part 16b. The first groove part 31d is formed in an end surface of the bottom part of the body part 16a that faces the first side, and the second groove part 31e is formed in an end surface of the fitting part 16b that faces the second side. The first groove part 31d and the second groove part 31e are formed with the same shape as each other and the same size as each other.

The main passage part 31b allows the body passage part 31a and the main liquid chamber 14 to communicate with each other. The main passage part 31b extends from a first end of the body passage part 31a to the first side, and is open on the main liquid chamber 14. The auxiliary passage part 31c allows the body passage part 31a and the auxiliary liquid chamber 15 to communicate with each other. The auxiliary passage part 31c extends from a second end of the body passage part 31a to the second side, and is open on the auxiliary liquid chamber 15. The main passage part 31b and the auxiliary passage part 31c are formed in a rectangular columnar shape. The main passage part 31b is formed in the fitting part 16b, and the auxiliary passage part 31c is formed in the body part 16a.

The second limiting passage 32 is provided at an outer peripheral part of the partitioning member 16. The second limiting passage 32 includes a circumferential groove part 32a, a main opening 32b, and an auxiliary opening 32c. The circumferential groove part 32a extends in the circumferential direction in the outer peripheral surface of the partitioning member 16, and is blocked from the outer side in the radial direction by an inner peripheral surface of the first attachment member 11. One of the first end and the second end of the circumferential groove part 32a in the circumferential direction communicates with the main liquid chamber 14 through the main opening 32b and the other thereof communicates with the auxiliary liquid chamber 15 through the auxiliary opening 32c. The second limiting passage 32 is provided in the body part 16a over the entire length.

In the present embodiment, an inner peripheral surface of the first limiting passage 31 is provided with flow changing protrusions 33 and 34 that change the flow of the liquid L that flows through into the first limiting passage 31.

The flow changing protrusion 33 or 34 protrudes from the inner peripheral surface of the first limiting passage 31 toward a radial inner side of the first limiting passage 31, and changes the flow of the liquid L that flows through the first limiting passage 31 in the axial direction of the first limiting passage 31. The flow changing protrusion 33 or 34 makes the liquid L that flows through the first limiting passage 31 flow along the surface of the flow changing protrusion 33 or 34, thereby bending the flow of the liquid L. The flow changing protrusion 33 or 34 is formed integrally with the partitioning member 16 as a rigid body having such rigidity that the flow changing protrusion is not deformed when the flow of the liquid L is received, for example, using a resin material or the like.

The flow changing protrusion 33 or 34 is provided within the body passage part 31a, and changes the flow of the liquid L that flows through the body passage part 31a in the axial direction (hereinafter referred to as a "flow passage axis M direction") of the body passage part 31a to a radial direction (hereinafter referred to as a "flow passage radial direction") of the body passage part 31a. A plurality of the flow changing protrusions 33 and 34 are provided in the flow passage axis M direction, and in an illustrated example, a pair of the flow changing protrusions is provided in the flow passage axis M direction at a distance from each other.

Figure 3:
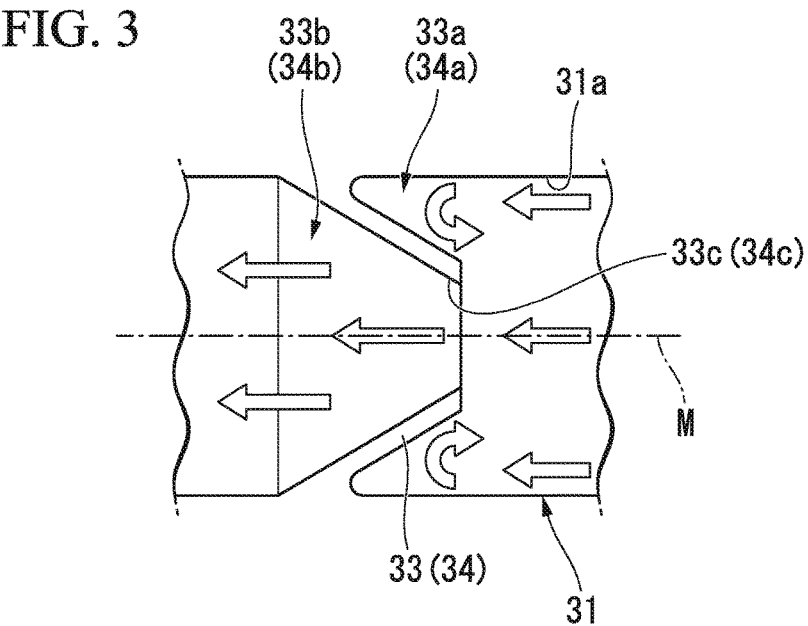
FIG. 3 is a view showing a flow changing space and a passage space that are provided in the partitioning member that constitutes the vibration-damping device shown in FIG. 1.

Additionally, in the present embodiment, as shown in FIGS. 1 to 3, the first limiting passage 31 and the flow changing protrusion 33 or 34 have symmetrical shapes with respect to the flow passage axis M in a vertical sectional view passing through the flow passage axis M and the flow changing protrusion 33 or 34. The first limiting passage 31 and the flow changing protrusion 33 or 34 are linearly symmetrical as the flow passage axis M as a reference in the above vertical sectional view. The flow changing protrusion 33 or 34 is disposed over the entire circumference of the flow passage axis M, and continuously extends over the entire circumference of the flow passage axis M in the example shown.

The flow changing protrusion 33 or 34 is formed in a tubular shape that extends in the flow passage axis M direction, and is formed in a cylindrical shape in the example shown. A first end of the flow changing protrusion 33 or 34 in the flow passage axis M direction is a base end (fixed end) coupled to the inner peripheral surface of the first limiting passage 31, and a second end thereof in the flow passage axis M direction is a protruding end (free end) non-coupled to the inner peripheral surface of the first limiting passage 31.

An outer peripheral surface of the flow changing protrusion 33 or 34 gradually decreases in diameter from the base end toward the protruding end, and is linearly inclined with respect to the flow passage axis M in the above vertical sectional view. In addition, in the present embodiment, the inner peripheral surface of the flow changing protrusion 33 or 34 also gradually decreases in diameter from the base end toward the protruding end, and the overall flow changing protrusion 33 or 34 gradually decreases in diameter from the base end toward the protruding end.

The protruding end of the flow changing protrusion 33 or 34 forms an inner peripheral edge of the passage holes 33c or 34c that is open on both sides in the flow passage axis M direction. In the example shown, the overall opening on a protruding end side of the flow changing protrusion 33 or 34 is the passage hole 33c or 34c, and the protruding end of the flow changing protrusion 33 or 34 constitutes the overall inner peripheral edge of the passage hole 33c or 34c.

Here, in the present embodiment, one first flow changing protrusion 33 and one second flow changing protrusion 34 are provided as the above flow changing protrusion. A first passage hole 33c (passage hole) that is an opening on a protruding end (free end) side of the first flow changing protrusion 33 faces the main liquid chamber 14 in the flow passage axis M direction, and a second passage hole 34c (passage hole) that is an opening on a protruding end (free end) side of the second flow changing protrusion 34 faces the auxiliary liquid chamber 15 in the flow passage axis M direction.

The first flow changing protrusion 33 is located on the main liquid chamber 14 side in the flow passage axis M direction, the second flow changing protrusion 34 is located on the auxiliary liquid chamber 15 side in the flow passage axis M direction, and the first flow changing protrusion 33 and the second flow changing protrusion 34 are located over the entire length in the flow passage axis M direction within the body passage part 31a. The first flow changing protrusion 33 and the second flow changing protrusion 34 are symmetrically formed in the flow passage axis M direction, and base ends (fixed end) of the first flow changing protrusion 33 and the second flow changing protrusion 34 are separated from each other in the flow passage axis M direction.

The first flow changing protrusion 33 and the second flow changing protrusion 34 partition the inside of the first limiting passage 31 into flow changing spaces 33a and 34a where the flow of the liquid L that flows into the first limiting passage 31 is changed, and passage spaces 33b and 34b through which the liquid L that flows into the first limiting passage 31 is passed. The flow changing protrusion 33 or 34 forms the flow changing space 33a or 34a in cooperation with the inner peripheral surface of the first limiting passage 31.

The flow changing space 33a or 34a is formed between the outer peripheral surface of the flow changing protrusion 33 or 34, and an inner peripheral surface of the body passage part 31a that is the inner peripheral surface of the first limiting passage 31. The outer peripheral surface of the flow changing protrusion 33 or 34 is a defining surface that defines the flow changing space 33a or 34a, and this defined surface is inclined with respect to the flow passage axis M in the above vertical sectional view.

The passage space 33b or 34b includes the passage hole 33c or 34c. The passage space 33b or 34b is formed by the inner peripheral surface of the flow changing protrusion 33 or 34, and is constituted by the overall inside of the flow changing protrusion 33 or 34.

The first flow changing protrusion 33 partitions the inside of the body passage part 31a into a first flow changing space 33a serving as the above flow changing space, and a first passage space 33b serving as the above passage space.

The first flow changing space 33a is formed in a ring shape coaxial with the flow passage axis M, and is open on the main liquid chamber 14 side in the flow passage axis M direction. In the above vertical sectional view, the space width of the first flow changing space 33a in the flow passage radial direction gradually decreases from the main liquid chamber 14 side toward the auxiliary liquid chamber 15 side in the flow passage axis M direction. A bottom surface of the first flow changing space 33a faces the main liquid chamber 14 side in the flow passage axis M direction, and the outer peripheral surface of the first flow changing protrusion 33 and the inner peripheral surface of the body passage part 31a are coupled together. In the above vertical sectional view, the bottom surface of the first flow changing space 33a is formed in the shape of a concavely curved surface that becomes concave toward the auxiliary liquid chamber 15 side in the flow passage axis M direction.

The first passage space 33b is formed in the shape of a frustum coaxial with the flow passage axis M, and in the example shown, in the shape of a truncated cone, and is open on both sides in the flow passage axis M direction. The first passage space 33b is gradually increased in diameter from the main liquid chamber 14 side toward the auxiliary liquid chamber 15 side in the flow passage axis M direction.

The second flow changing protrusion 34 partitions the inside of the body passage part 31a into a second flow changing space 34a serving as the above flow changing space, and a second passage space 34b serving as the above passage space.

The second flow changing space 34a is formed in a ring shape coaxial with the flow passage axis M, and is open on the auxiliary liquid chamber 15 side in the flow passage axis M direction. In the above vertical sectional view, the space width of the second flow changing space 34a gradually decreases from the auxiliary liquid chamber 15 side toward the main liquid chamber 14 side in the flow passage axis M direction. A bottom surface of the second flow changing space 34a faces the auxiliary liquid chamber 15 side in the flow passage axis M direction, and the outer peripheral surface of the second flow changing protrusion 34 and the inner peripheral surface of the body passage part 31a are coupled together. In the above vertical sectional view, the bottom surface of the second flow changing space 34a is formed in the shape of a concavely curved surface that becomes concave toward the main liquid chamber 14 side in the flow passage axis M direction.

The second passage space 34b is formed in the shape of a frustum coaxial with the flow passage axis M, and in the example shown, in the shape of a truncated cone, and is open on both sides in the flow passage axis M direction. The second passage space 34b is gradually increased in diameter from the auxiliary liquid chamber 15 side toward the main liquid chamber 14 side in the flow passage axis M direction.

In addition, in the example shown, the flow changing protrusion 33 or 34 is split into two in the direction of the axis O, and each flow changing protrusion 33 or 34 is constituted of a first split protrusion 35a on the second side, and a second split protrusion 35b on the first side. The first split protrusion 35a and the second split protrusion 35b are formed with the same shape as each other and with the same size as each other, and the flow changing protrusion 33 or 34 is equally divided into two in the direction of the axis O along the above boundary surface. The first split protrusion 35a is disposed within the first groove part 31d and is formed integrally with the body part 16a, and the second split protrusion 35b is disposed within the second groove part 31e and is formed integrally with the fitting part 16b.

Next, the operation of the vibration-damping device 10 will be described.

If vibration in the direction of the axis O is input to the vibration-damping device 10 as shown in FIG. 1 from the vibration generating part, the first attachment member 11 and the second attachment member 12 are displaced relative to each other while elastically deforming the elastic body 13 and the liquid pressure of the main liquid chamber 14 fluctuates. Accordingly, the liquid L flows between the main liquid chamber 14 and the auxiliary liquid chamber 15 through the limiting passages 31 and 32. In this case, the liquid L within the main liquid chamber 14 and the auxiliary liquid chamber 15 flows through the first limiting passage 31 having a smaller flow resistance, in the first limiting passage 31 and the second limiting passage 32.

Here, the flow speed of the liquid L that flows into the first limiting passage 31 and the second limiting passage 32 is determined by the product of the amplitude of an input vibration and the vibration frequency of the input vibration. It is generally understood that, as compared to an idle vibration, the amplitude of a shake vibration is greater and the flow speed of the liquid L is greater.

That is, if a shake vibration is input to the vibration-damping device 10 in the direction of the axis O, a large amount of the liquid L per unit time flows into the first limiting passage 31 from the main liquid chamber 14 according to the amplitude of this shake vibration. Therefore, the flow speed of the liquid L that flows through the first limiting passage 31 is increased to a certain value or more.

In this case, the liquid L that flows into the first limiting passage 31 from the inside of the main liquid chamber 14 first flows into the body passage part 31a from the main passage part 31b of the first limiting passage 31, and reaches a portion of the body passage part 31a where the first flow changing protrusion 33 is located.

Then, as shown in FIG. 3, the liquid L that flows through the outer side in the flow passage radial direction within the body passage part 31a of the above liquid L, flows into the first flow changing space 33a, and flows toward the protruding end side of the first flow changing protrusion 33 along the surface of the first flow changing protrusion 33, and thereby the flow of the liquid L is changed to the inner side in the flow passage radial direction. Additionally, the liquid L that flows through the inner side in the flow passage radial direction within the body passage part 31a passes through the first passage hole 33c, flows into the first passage space 33b, and passes through this first passage space 33b in the flow passage axis M direction. In this case, for example, by changing the flow of the liquid L that flows into the first flow changing space 33a so as to run along the outer peripheral surface of the first flow changing protrusion 33, the liquid L can be swirled with the circumference extending around the flow passage axis M as a swirling axis.

As a result, due to, for example, an energy loss resulting from the collision between the liquid L that passes through the first passage hole 33c in the flow passage axis M direction, and the liquid L, the flow of which is changed by the first flow changing protrusion 33, an energy loss caused by changing the viscous resistance of the liquid L and the flow of the liquid L and forming a swirling flow, an energy loss caused by the friction between the liquid L and the first flow changing protrusion 33, or the like, the pressure loss of the liquid L is increased, and the liquid L becomes difficult to flow through the first limiting passage 31.

Here, in the vibration-damping device 10, the first limiting passage 31 and the flow changing protrusion 33 or 34 have symmetrical shapes with respect to the flow passage axis M in the above vertical sectional view. Thus, in this vertical sectional view, the flows of the respective liquids L that flow through portions located on both outsides in the flow passage radial direction are symmetrically changed with respect to the flow passage axis M by the first flow changing protrusion 33. Since the liquid L, the flow of which is changed in this way, collides against the liquid that passes through the first passage hole 33c in the flow passage axis M direction, from both the outsides in the flow passage radial direction, the pressure loss of the liquid L is increased effectively.

Additionally, if the liquid L within the auxiliary liquid chamber 15 flows toward the main liquid chamber 14 side through the first limiting passage 31, the liquid L first flows into the body passage part 31a from the auxiliary passage part 31c of the first limiting passage 31, and reaches a portion of the body passage part 31a where the second flow changing protrusion 34 is located. Then, the liquid L that flows through the outer side in the flow passage radial direction within the body passage part 31a of the above liquid L, flows into the second flow changing space 34a, and the flow of the liquid is changed, and the liquid L that flows through the inner side in the flow passage radial direction within the body passage part 31a, flows into the second passage space 34b through the second passage hole 34c, and passes through the second passage space 34b. Even in this case, since the flow of the liquid L that flows into the second flow changing space 34a is changed, the pressure loss of the liquid L is increased and the liquid L becomes difficult to flow through the first limiting passage 31.

In this way, when the shake vibration is input in the direction of the axis O, the pressure loss of the liquid L within the first limiting passage 31 is increased, and the liquid L becomes difficult to flow through the first limiting passage 31. Therefore, the liquid L flows preferentially through the second limiting passage 32 between the main liquid chamber 14 and the auxiliary liquid chamber 15, and liquid column resonance (resonance) occurs within the second limiting passage 32, and the shake vibration is absorbed and dampened.

On the other hand, if an idle vibration is input to the vibration-damping device 10 in the direction of the axis O, a little amount of the liquid per unit time flows into the first limiting passage 31 according to the amplitude of this idle vibration. Therefore, the flow speed of the liquid L that flows through the first limiting passage 31 is not increased. As a result, even if the flow changing protrusions 33 and 34 change the flow of the liquid L within the first limiting passage 31, the pressure loss of the liquid L is limited and the liquid L smoothly flows through the first limiting passage 31.

Accordingly, the liquid L actively flows through the first limiting passage 31, and liquid column resonance (resonance) occurs within the first limiting passage 31 and the idle vibration is absorbed and dampened.

As described above, according to the vibration-damping device 10 related to the present embodiment, it is possible to absorb and dampen both the shake vibration and the idle vibration by providing the flow changing protrusions 33 and 34 instead of the plunger member as in the above related art. Therefore, generation of abnormal noise can be suppressed and simplification of structure and facilitation of manufacture in the vibration-damping device 10 can be achieved.

Additionally since the flow changing protrusion 33 or 34 partitions the inside of the first limiting passage 31 into the flow changing space 33a or 34a and the passage space 33b or 34b, it is possible to suppress the influence from the liquid L that passes through the passage space 33b or 34b, thereby precisely changing the flow of the liquid L that has flowed into the flow changing space 33a or 34a. Therefore, when the flow speed of the liquid L is increased, the pressure loss of the liquid L can be increased reliably.

Additionally, since the flow changing space 33a or 34a is formed between the outer peripheral surface of the flow changing protrusion 33 or 34 and the inner peripheral surface of the first limiting passage 31, the flow changing space 33a or 34a can be formed over the entire circumference of the flow passage axis M.

Accordingly, the flow of the liquid L that flows through the outer side in the flow passage radial direction within the body passage part 31a of the liquid L that flows through the body passage part 31a, can be changed over the entire circumference of the flow passage axis M. As a result, when the flow speed of the liquid L is increased, the pressure loss of the liquid L can be increased much more reliably.

Additionally, since the passage space 33b or 34b is formed by the inner peripheral surface of the flow changing protrusion 33 or 34, the passage space 33b or 34b can be made to open toward both sides in the flow passage axis M direction. Accordingly, it is possible to circulate the liquid L that passes through the passage space 33b or 34b within the passage space 33b or 34b in the flow passage axis M direction. As a result, the liquid L can be smoothly circulated within the passage space 33b or 34b.

Additionally, the outer peripheral surface of the flow changing protrusion 33 or 34 gradually decreases in diameter from the base end toward the protruding end. Therefore, by changing the flow of the liquid L that flows into the flow changing space 33a or 34a so as to run along the outer peripheral surface of the flow changing protrusion 33 or 34, the liquid L can be swirled with the circumference extending around the flow passage axis M as a swirling axis, and the direction of flow of the liquid L can be reversed in the flow passage axis M direction. Accordingly, the pressure loss of the liquid L caused when the liquid L that passes through the passage hole 33c or 34c in the flow passage axis M direction collides against the liquid L, the flow of which is changed by the flow changing protrusion 33 or 34, can be increased much more reliably.

Additionally, in the present embodiment, the inner peripheral surface of the flow changing protrusion 33 or 34 also gradually decreases in diameter from the base end toward the protruding end, and the overall flow changing protrusion 33 or 34 gradually decreases in diameter from the base end toward the protruding end. Therefore, when the liquid L that flows into the passage space 33b or 34b from the passage hole 33c or 34c flows through the passage space 33b or 34b in the flow passage axis M direction, it is possible to limit the energy loss resulting from the friction between this liquid L and the inner peripheral surface of the flow changing protrusion 33 or 34. Hence, the liquid L can be still more smoothly circulated within the passage space 33b or 34b.

Moreover, since the first flow changing protrusion 33 and the second flow changing protrusion 34 are provided as the flow changing protrusions, the pressure loss of the liquid L can be increased by changing the flow of the liquid L that flows from the main liquid chamber 14 to the auxiliary liquid chamber 15, using the first flow changing protrusion 33. Additionally, even by changing the flow of the liquid L that flows from the auxiliary liquid chamber 15 to the main liquid chamber 14, using the second flow changing protrusion 34, it is possible to increase the pressure loss of the liquid L. Hence, this makes it difficult to reliably circulate the liquid L through the first limiting passage 31 when a shake vibration is input.

Second Embodiment

Figure 4:
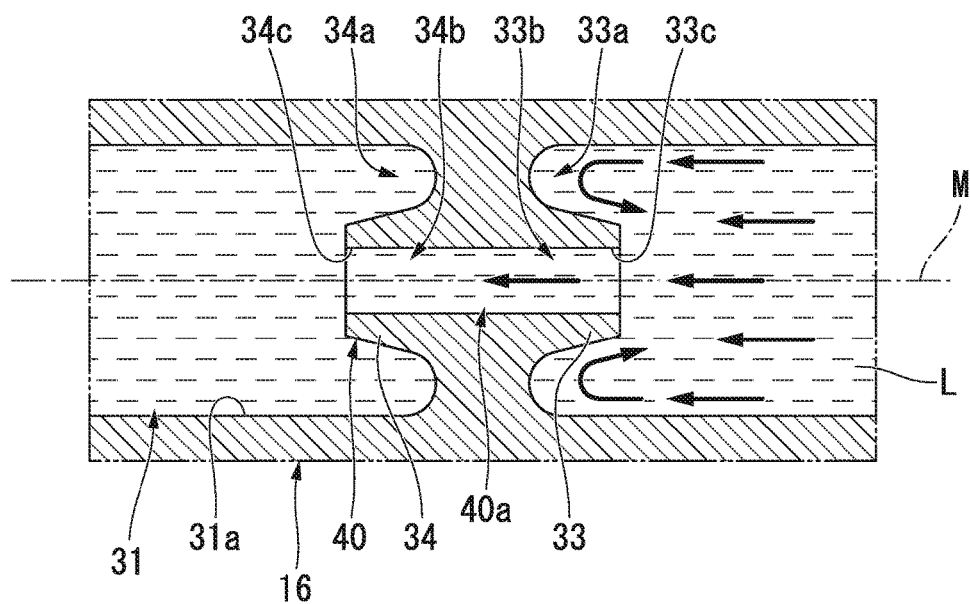
FIG. 4 is a longitudinal sectional view, which is an enlarged view of main parts, of a vibration-damping device related to a second embodiment of the present invention.

Next, a second embodiment of the vibration-damping device related to the present invention will be described with reference to FIG. 4.

In addition, in the second embodiment, the same portions as the constituent elements in the first embodiment will be designated by the same reference signs and a description thereof will be omitted, and only different points will be described.

In the vibration-damping device of the present embodiment, the first flow changing protrusion 33 and the second flow changing protrusion 34 are disposed adjacent to each other in the flow passage axis M direction, and the base ends of the first flow changing protrusion 33 and the second flow changing protrusion 34 are directly connected together. The inner peripheral surfaces of the respective flow changing protrusions 33 and 34 have the same diameter over the entire length in the flow passage axis M direction, and the passage spaces 33b and 34b are formed in a columnar shape that extends in the flow passage axis M direction. A second end of the first passage space 33b and a first end of the second passage space 34b are directly connected together.

In this vibration-damping device, a coupled body 40 in which the base ends of the flow changing protrusions 33 and 34 are directly connected together is formed in a tubular shape that extends in the flow passage axis M direction. The inside of this coupled body 40 forms a connected space 40a in which the passage spaces 33b and 34b are connected together in the flow passage axis M direction. An inner peripheral surface of the connected space 40a is smoothly continuous over the entire length in the flow passage axis M direction, and a stepped part is not formed.

Third Embodiment

Figure 5:
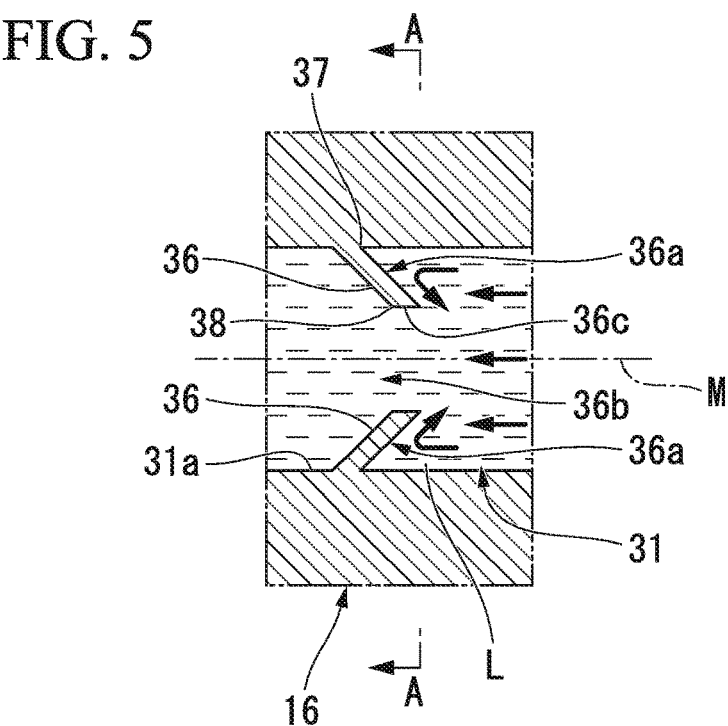
FIG. 5 is a longitudinal sectional view, which is an enlarged view of main parts, of a vibration-damping device related to a third embodiment of the present invention.

Next, a third embodiment of the vibration-damping device related to the present invention will be described with reference to FIGS. 5 and 6.

In addition, in the third embodiment, the same portions as the constituent elements in the first embodiment will be designated by the same reference signs and a description thereof will be omitted, and only different points will be described.

In the vibration-damping device of the present embodiment, a flow changing protrusion 36 is formed in a plate shape that protrudes from the inner peripheral surface of the first limiting passage 31, instead of being formed in a tubular shape that extends in the flow passage axis M direction. The flow changing protrusion 36 is intermittently disposed over the entire circumference of the flow passage axis M, and a pair of the flow changing protrusions 36 are formed with the flow passage axis M being interposed therebetween in the example shown. The flow changing protrusions 36 are formed with the same shape as each other and with the same size as each other.

Each flow changing protrusion 36 assumes a semicircular shape in a cross-sectional view of the first limiting passage 31 orthogonal to the flow passage axis M, and an outer peripheral edge of the flow changing protrusion 36 is constituted of a coupling part 37 and a connecting part 38. The coupling part 37 extends in a circular-arc shape around the flow passage axis M. The coupling part 37 is continuously coupled to the inner peripheral surface of the body passage part 31a, which is the inner peripheral surface of the first limiting passage 31, over the entire length around the flow passage axis M. The connecting part 38 extends linearly and connects both ends of the coupling part 37 around the flow passage axis M together. The pair of flow changing protrusions 36 are symmetrically disposed with the flow passage axis M being interposed therebetween in the above cross-sectional view, and the pair of entire flow changing protrusions 36 face each other in the flow passage radial direction.

The first limiting passage 31 and the flow changing protrusions 36 have symmetrical shapes with respect to the flow passage axis M in a vertical sectional view passing through the flow passage axis M and a central part of the coupling part 37 around the flow passage axis M. Each flow changing protrusion 36 protrudes being inclined in the flow passage axis M direction from the inner peripheral surface of the body passage part 31a, in the above vertical sectional view.

In this vibration-damping device, a passage hole 36c is formed between protruding ends of the pair of flow changing protrusions 36. The passage hole 36c is formed in the shape of an elongated hole between the connecting parts 38 in the above cross-sectional view. Additionally, the flow changing space 36a is open only on one side in the flow passage axis M direction, and is formed between the surface of each flow changing protrusion 36 and the inner peripheral surface of the body passage part 31a. Moreover, the passage space 36b is open on both sides in the flow passage axis M direction, and a portion of a wall surface of the passage space 36b is constituted by the surface of each flow changing protrusion 36.

Figure 6:
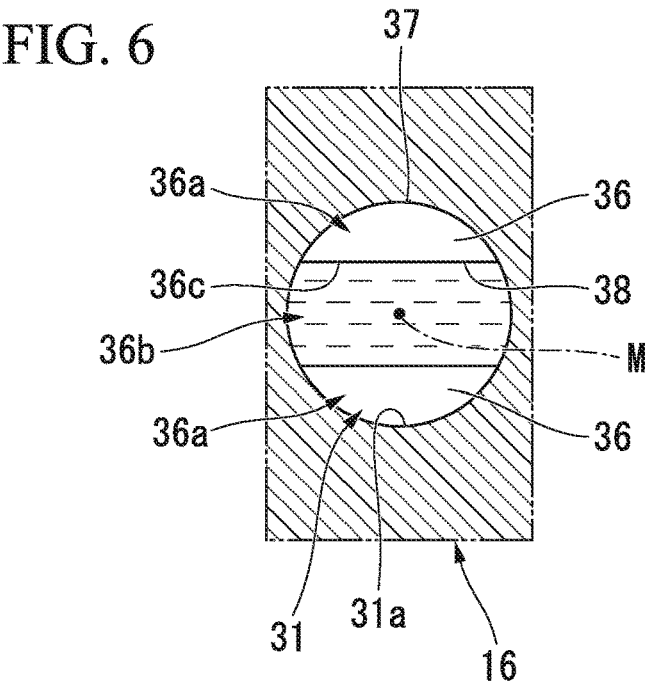
FIG. 6 is a sectional view as seen in the direction of arrow A-A shown in FIG. 5.

In addition, as shown in FIG. 6, in the present embodiment, the pair of flow changing protrusions 36 are symmetrically disposed with the flow passage axis M being disposed therebetween in the above cross-sectional view. However, the present invention is not limited to this, and other forms in which at least portions of the pair of flow changing protrusions face each other in the flow passage radial direction may be adopted.

Fourth Embodiment

Figure 7:
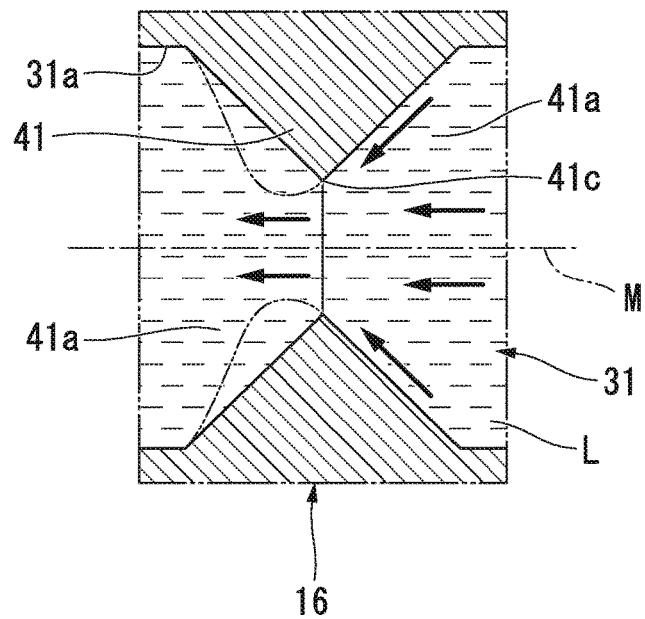
FIG. 7 is a longitudinal sectional view, which is an enlarged view of main parts, of a vibration-damping device related to a fourth embodiment of the present invention.

Next, a fourth embodiment of the vibration-damping device related to the present invention will be described with reference to FIG. 7.

In addition, in the fourth embodiment, the same portions as the constituent elements in the first embodiment will be designated by the same reference signs and a description thereof will be omitted, and only different points will be described.

In the vibration-damping device of the present embodiment, a flow changing protrusion 41 is formed in an annular shape that is open on the flow passage axis M direction, instead of being formed in a tubular shape that extends in the flow passage axis M direction. The flow changing protrusion 41 continuously extends the entire circumference of the flow passage axis M.

The flow changing protrusion 41 is formed such that the size thereof in the flow passage axis M direction becomes small from both sides in the flow passage axis M direction gradually from the base end toward the protruding end and assumes a triangular shape that becomes convex toward the inner side in the flow passage radial direction in the above vertical sectional view, and in the example shown, an isosceles triangular shape. End surfaces of the flow changing protrusion 41 that face the flow passage axis M direction are all inclined surface that are inclined with respect to the flow passage axis M, in the above vertical sectional view.

In this vibration-damping device, a passage hole 41c is the inside of the flow changing protrusion 41, and the above flow changing space and the above passage space are not partitioned within the body passage part 31a. The inside of the body passage part 31a is partitioned into a pair of partition spaces 41a by the flow changing protrusion 41. The partition spaces 41a are located on both sides with the flow changing protrusion 41 being disposed therebetween in the flow passage axis M direction, and communicate with each other through the passage hole 41c.

When vibration is input to this vibration-damping device and the liquid L flows through the first limiting passage 31 between the main liquid chamber 14 and the auxiliary liquid chamber 15, the liquid L that flows through the outer side in the flow passage radial direction within the body passage part 31a of the liquid L that flows through the body passage part 31a, flows from the base end side toward the protruding end side along the end surfaces of the flow changing protrusion 41, and thereby the flow of the liquid L is changed to the inner side in the flow passage radial direction. Additionally, the liquid L that flows through the inner side in the flow passage radial direction within the body passage part 31a of the liquid L that flows through the body passage part 31a, passes through the passage hole 41c in the flow passage axis M direction.

Accordingly, if the flow speed of the liquid L is increased, the pressure loss of the liquid L is increased due to, for example, an energy loss resulting from the collision between the liquid L that passes through the passage hole 41c in the flow passage axis M direction, and the liquid L, the flow of which is changed by the flow changing protrusion 41. In this case, the liquid L does not easily flow into a region of the body passage part 31a, for example, between a two-dot chain line shown in FIG. 7 and the inner peripheral surface of the body passage part 31a, and separation of a flow occurs. Accordingly, the pressure loss of the liquid L is increased even by the effective sectional area of the first limiting passage 31 decreasing within the partition space 41a of the body passage part 31a.

Fifth Embodiment

Next, a fifth embodiment of the vibration-damping device related to the present invention will be described with reference to FIG. 8.

In addition, in the fifth embodiment, the same portions as the constituent elements in the fourth embodiment will be designated by the same reference signs and a description thereof will be omitted, and only different points will be described.

In the vibration-damping device of the present embodiment, a flow changing protrusion 42 is formed in a trapezoidal shape that becomes convex toward the inner side in the flow passage radial direction, and in the example shown, in the shape of an isosceles trapezoid, in the above vertical sectional view. The passage hole 42c is formed in a columnar shape.

Figure 8:
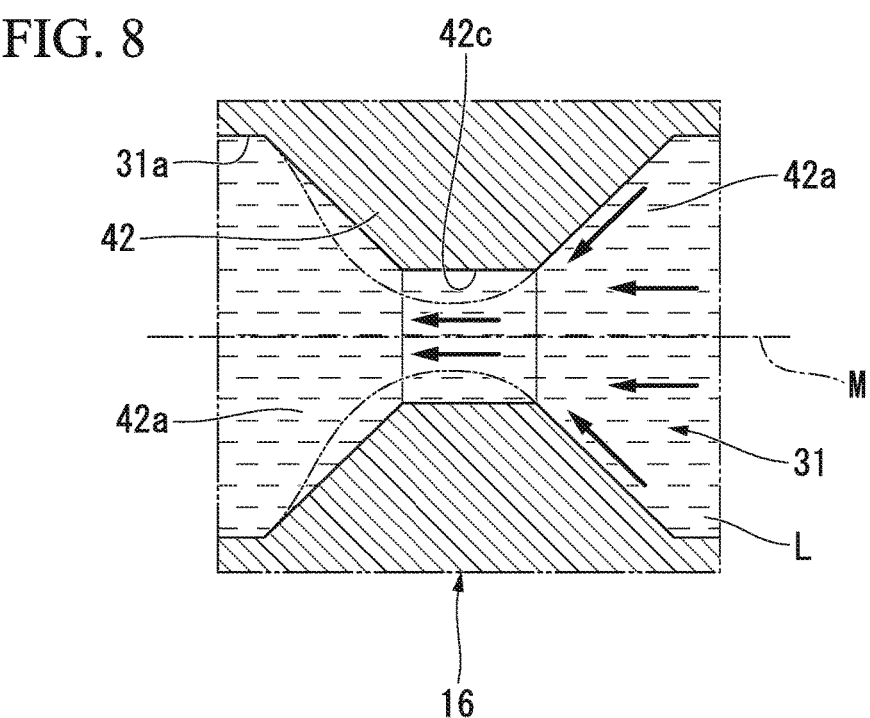
FIG. 8 is a longitudinal sectional view, which is an enlarged view of main parts, of a vibration-damping device related to a fifth embodiment of the present invention.

Even in this vibration-damping device, similar to the vibration-damping device related to the above fourth embodiment, separation of a flow occurs, the liquid L does not easily flow into a region of the body passage part 31a between a two-dot chain line shown in FIG. 8 and the inner peripheral surface of this body passage part 31a, and the effective sectional area of the first limiting passage 31 decreases. Here, in the present embodiment, since the passage hole 42c is formed in a columnar shape, separation of the liquid occurs in both of the partition space 42a and the passage hole 42c of the body passage part 31a, and the pressure loss of the liquid L is increased effectively.

Sixth Embodiment

Figure 9:
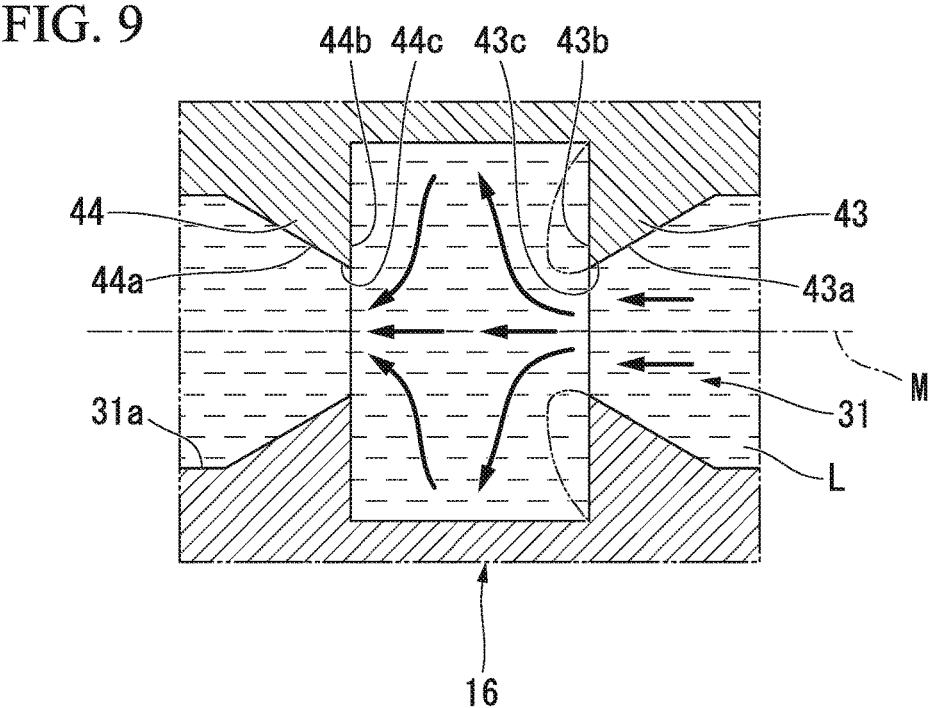
FIG. 9 is a longitudinal sectional view, which is an enlarged view of main parts, of a vibration-damping device related to a sixth embodiment of the present invention.

Next, a sixth embodiment of the vibration-damping device related to the present invention will be described with reference to FIG. 9.

In addition, in the sixth embodiment, the same portions as the constituent elements in the fourth embodiment will be designated by the same reference signs and a description thereof will be omitted, and only different points will be described.

In the vibration-damping device of the present embodiment, a pair of flow changing protrusions 43 and 44 is provided at a distance from each other in the flow passage axis M direction within the body passage part 31a, and an intermediate part of the body passage part 31a in the flow passage axis M direction, which is located between the flow changing protrusions 43 and 44, has a greater diameter than each portion located on the outside in the flow passage axis M direction with respect to this intermediate part.

The flow changing protrusions 43 and 44 are formed in the shape of a right-angled triangle that becomes convex toward the inner side in the flow passage radial direction, in the above vertical sectional view. End surfaces of the flow changing protrusions 43 and 44 include inclined end surfaces 43a and 44a that are inclined with respect to the flow passage axis M in the above vertical sectional view, and orthogonal end surfaces 43b and 44b that are orthogonal to the flow passage axis M in the above vertical sectional view.

Here, in the present embodiment, one first flow changing protrusion 43 and one second flow changing protrusion 44 are provided as the above flow changing protrusion. The first flow changing protrusion 43 is provided on the main liquid chamber 14 side in the flow passage axis M direction, and the inclined end surface 43a of the first flow changing protrusion 43 faces the main liquid chamber 14 side in the flow passage axis M direction. A first passage hole 43c serving as the above passage hole is provided inside the first flow changing protrusion 43. The second flow changing protrusion 44 is provided on the auxiliary liquid chamber 15 side in the flow passage axis M direction, and the inclined end surface 44a of the second flow changing protrusion 44 faces the auxiliary liquid chamber 15 side in the flow passage axis M direction. The second passage hole 44c serving as the above passage hole is provided inside the second flow changing protrusion 44.

When vibration is input to this vibration-damping device and the liquid L flows through the first limiting passage 31 from the main liquid chamber 14 toward the auxiliary liquid chamber 15, the liquid L that flows through the outer side in the flow passage radial direction within the body passage part 31a of the liquid L that has flowed into the body passage part 31a from the main passage part 31b, flows from the base end side toward the protruding end side along the inclined end surface 43a of the first flow changing protrusion 43, and thereby the flow of the liquid L is changed toward the inner side in the flow passage radial direction. Additionally, the liquid L that flows through the inner side in the flow passage radial direction within the body passage part 31a of the liquid L that has flowed into the body passage part 31a, passes through the first passage hole 43c in the flow passage axis M direction.

Accordingly, if the flow speed of the liquid L increases, the pressure loss of the liquid L is increased due to, for example, an energy loss resulting from the collision between the liquid L that flows into the first passage hole 43c in the flow passage axis M direction and the liquid L, the flow of which is changed by the first flow changing protrusion 43, reduction (refer to a two-dot chain line shown in FIG. 9) of effective sectional area resulting from separation of a flow in the intermediate part of the body passage part 31a in the flow passage axis M direction, or the like.

Here, an intermediate part of the body passage parts 31a in the flow passage axis M direction has a greater diameter than the other portions. Therefore, if the liquid L passes through the first passage hole 43c and flows into the intermediate part of the body passage part 31a, the liquid L that flows through the outer side in the flow passage radial direction within the body passage part 31a of the above liquid L, flows in the flow passage axis M direction widening to the outer side in the flow passage radial direction so as to run along an inner peripheral surface of the intermediate part. As a result, when the liquid L passes through the second passage hole 44c from the intermediate part, the liquid L that flows through the outer side in the flow passage radial direction within the body passage part 31a of the above liquid L, flows from the base end toward the protruding end along the orthogonal end surface 44b of the second flow changing protrusion 44, and thereby the flow of the liquid L is changed toward the inner side in the flow passage radial direction.

Accordingly, if the flow speed of the liquid L is increased, the pressure loss of the liquid L is increased due to, for example, an energy loss resulting from the collision between the liquid L that passes through the second passage hole 44c in the flow passage axis M direction, and the liquid L, the flow of which is changed by the second flow changing protrusion 44.

Seventh Embodiment

Figure 10:
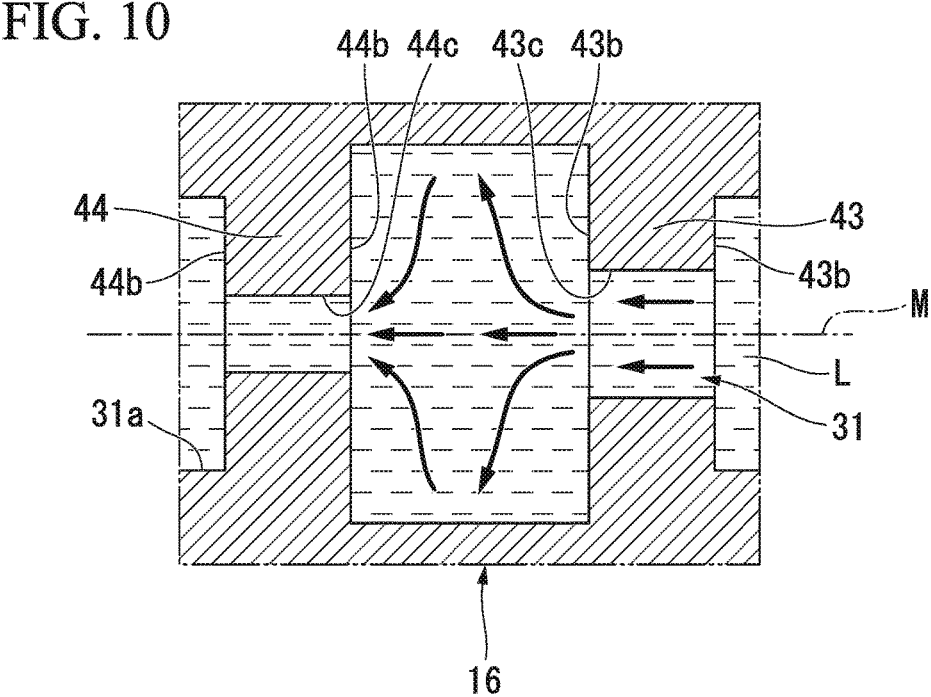
FIG. 10 is a longitudinal sectional view, which is an enlarged view of main parts, of a vibration-damping device related to a seventh embodiment of the present invention.

Next, a seventh embodiment of the vibration-damping device related to the present invention will be described with reference to FIG. 10.

In addition, in the seventh embodiment, the same portions as the constituent elements in the sixth embodiment will be designated by the same reference signs and a description thereof will be omitted, and only different points will be described.

In the vibration-damping device of the present embodiment, the flow changing protrusions 43 and 44 are formed in a rectangular shape, instead of being formed in a right-angled triangle that becomes convex toward the inner side in the flow passage radial direction.

Both end surfaces of the flow changing protrusions 43 and 44 are respectively the orthogonal end surfaces 43b and 44b. The first passage hole 43c is provided over the entire length in the flow passage axis M direction of the first flow changing protrusion 43, within the first flow changing protrusion 43. The second passage hole 44c is provided over the entire length in the flow passage axis M direction of the second flow changing protrusion 44, within the second flow changing protrusion 44. The first passage hole 43c and the second passage hole 44c have the same diameter over the entire length in the flow passage axis M direction. The first passage hole 43c has a greater diameter than the second passage hole 44c.

When vibration is input to this vibration-damping device and the liquid L flows through the first limiting passage 31 from the main liquid chamber 14 toward the auxiliary liquid chamber 15, the liquid L that flows through the outer side in the flow passage radial direction within the body passage part 31a of the liquid L that has flowed into the body passage part 31a from the main passage part 31b, flows from the base end toward the protruding end along the orthogonal end surface 43b that faces the outside in the flow passage axis M direction in the first flow changing protrusion 43, and thereby the flow of the liquid L is changed toward the inner side in the flow passage radial direction. Additionally, the liquid L that flows through the inner side in the flow passage radial direction within the body passage part 31a of the liquid L that has flowed into the body passage part 31a, passes through the first passage hole 43c in the flow passage axis M direction.

Accordingly, if the flow speed of the liquid L is increased, the pressure loss of the liquid L is increased due to, for example, an energy loss resulting from the collision between the liquid L that passes through the first passage hole 43c in the flow passage axis M direction, and the liquid L, the flow of which is changed by the first flow changing protrusion 43.

In addition, the technical scope of the present invention is not limited to the above embodiments, and various changes can be made without departing from the concept of the present invention.

In the first, second, sixth, and seventh embodiments, the first flow changing protrusions 33 and 43 are located on the main liquid chamber 14 side in the flow passage axis M direction, and the second flow changing protrusions 34 and 44 are located on the auxiliary liquid chamber 15 side in the flow passage axis M direction. However, the present invention is not limited to this. For example, the first flow changing protrusions may be located on the auxiliary liquid chamber side in the flow passage axis M direction, and the second flow changing protrusions may be located on the main liquid chamber side in the flow passage axis M direction.

Additionally, in the first, second, sixth, and seventh embodiments, one first flow changing protrusion 33 or 43 and one second flow changing protrusion 34 or 44 are provided as the flow changing protrusion. However, the present invention is not limited to this. For example, a plurality of the first flow changing protrusions may be provided or a plurality of the second flow changing protrusions may be provided. Moreover, the flow changing protrusion may be provided with at least one of the first flow changing protrusion and the second flow changing protrusion.

Additionally, in the first and second embodiments, the outer peripheral surface of the flow changing protrusion 33 or 34 gradually decreases in diameter from the base end toward the protruding end. However, the present invention is not limited to this. For example, the outer peripheral surface of each flow changing protrusion may be formed in a tubular shape with the same diameter over the entire length in the flow passage axial direction, and the base end of the flow changing protrusion may be coupled to the inner peripheral surface of the first limiting passage via a flange part.

Additionally, the first limiting passage 31 and the flow changing protrusion 33, 34, 36, 41, 42, 43, or 44 may not be perfect linear symmetrical with the flow passage axis M as a reference in the above vertical sectional view. For example, there may be a slight difference in the shape, size, or the like of the first limiting passage and the flow changing protrusions on a first side and a second side in the flow passage radial direction with respect to the flow passage axis, in the above vertical sectional view.

Additionally, in the above embodiments, the flow passage axis M that is a central axis of the body passage part 31a is orthogonal to the above axis O. However, the present invention is not limited to this. For example, the flow passage axis may extend in the axis direction or may extend in the circumferential direction.

Moreover, in the above embodiments, the first limiting passage 31 and the second limiting passage 32 are independent from each other within the partitioning member 16, and a flow passage is not made to serve a double purpose. However, the present invention is not limited to this. For example, a flow passage may serve as both a part of the first limiting passage and a part of the second limiting passage.

Additionally, in the above embodiments, the partitioning member 16 partitions the liquid chamber within the first attachment member 11 into the main liquid chamber 14 having the elastic body 13 on a portion of the wall surface thereof, and the auxiliary liquid chamber 15. However, the present invention is not limited to this. For example, a pair of elastic bodies in the axis direction may be provided instead of providing the above diaphragm, or a pressure-receiving liquid chamber having an elastic body on a portion of the wall surface thereof may be provided instead of providing the auxiliary liquid chamber. That is, the partitioning member may be appropriately changed to another configuration in which the liquid chamber within the first attachment member in which a liquid is enclosed is partitioned into the first liquid chamber and the second liquid chamber, and at least one of the first liquid chamber and the second liquid chamber has an elastic body on a portion of the wall surface thereof.

Additionally, in the above embodiments, a case where an engine is connected to the second attachment member 12 and the first attachment member 11 is connected to a vehicle body is described. However, contrary to this, the first and second attachment members may be connected.

Moreover, the vibration-damping device 10 related to the present invention is not limited to engine mounts of vehicles and can also be applied to those other than the engine mounts. For example, the present invention can also be applied to mounts of generators loaded on construction machines, or can also be applied to mounts of machines installed in factories or the like.

In addition, the constituent elements in the above embodiments can be substituted with well-known constituent elements without departing from the concept of the invention, and the above embodiments may be appropriately combined together.

INDUSTRIAL APPLICABILITY

According to the vibration-damping device related to the present invention, generation of abnormal noise can be suppressed and simplification of structure and facilitation of manufacture can be achieved.

REFERENCE SIGNS LIST

10: VIBRATION-DAMPING DEVICE
11: FIRST ATTACHMENT MEMBER
12: SECOND ATTACHMENT MEMBER
13: ELASTIC BODY
14: MAIN LIQUID CHAMBER (FIRST LIQUID CHAMBER)
15: AUXILIARY LIQUID CHAMBER (SECOND LIQUID CHAMBER)
16: PARTITIONING MEMBER
31: FIRST LIMITING PASSAGE
32: SECOND LIMITING PASSAGE
33, 34, 36, 41, 42, 43, 44: FLOW CHANGING PROTRUSION
33a, 34a, 36a: FLOW CHANGING SPACE
33b, 34b, 36b: PASSAGE SPACE
33c, 41c, 42c, 43c, 44c: PASSAGE HOLE
L: LIQUID

The invention claimed is:

1. A vibration-damping device comprising:
a tubular first attachment member coupled to any one of a vibration generating part and a vibration receiving part, and a second attachment member coupled to the other thereof;
an elastic body that couples the first attachment member and the second attachment member together; and
a partitioning member that partitions a liquid chamber within the first attachment member having a liquid enclosed therein into a first liquid chamber and a second liquid chamber,
wherein at least one of the first liquid chamber and the second liquid chamber has the elastic body on a portion of a wall surface thereof,
wherein a limiting passage that allows the first liquid chamber and the second liquid chamber to communicate with each other is formed in the partitioning member,
wherein the limiting passage includes a first limiting passage that causes resonance with respect to the input of an idle vibration, and a second limiting passage that causes resonance with respect to the input of a shake vibration,
wherein an inner peripheral surface of the first limiting passage is provided with a flow changing protrusion that protrudes toward an inner side in a radial direction of the first limiting passage and that changes the flow of a liquid that flows through the first limiting passage in an axial direction of the first limiting passage,
wherein, in a vertical cross-sectional view passing through an axis of the first limiting passage and through the flow changing protrusion, the first limiting passage and the flow changing protrusion have symmetrical shapes with respect to the axis of the first limiting passage,
wherein a protruding end of the flow changing protrusion forms an inner peripheral edge of a passage hole that is open on both sides in the axial direction of the first limiting passage,
wherein the flow changing protrusion is a rigid body having such rigidity that the flow changing protrusion is not deformed when the flow of the liquid is received by the flow changing protrusion, and
the passage hole has a same axis as the axis of the first limiting passage and the protruding end of the flow changing protrusion does not overlap the axis of the first limiting passage.

2. The vibration-damping device according to claim 1,
wherein the flow changing protrusion partitions the first limiting passage into a flow changing space that is formed between the flow changing protrusion and an inner peripheral surface of the first limiting passage and changes the flow of the liquid flowing thereinto, and a passage space that has the passage hole and allows the liquid flowing thereinto to pass therethrough.

3. The vibration-damping device according to claim 2,
wherein the flow changing protrusion extends in the axial direction of the first limiting passage, and an opening thereof on a protruding end side is formed in a tubular shape used as the passage hole,
wherein the flow changing space is formed between an outer peripheral surface of the flow changing protrusion and an inner peripheral surface of the first limiting passage, and
wherein the passage space is formed by an inner peripheral surface of the flow changing protrusion.

4. The vibration-damping device according to claim 3,
wherein the outer peripheral surface of the flow changing protrusion gradually decreases in diameter from a base end toward a protruding end.

5. The vibration-damping device according to claim 4,
wherein the flow changing protrusion further comprising:
a first flow changing protrusion in which the opening on the protruding end side faces a first liquid chamber side in the axial direction of the first limiting passage; and
a second flow changing protrusion in which the opening on the protruding end side faces a second liquid chamber side in the axial direction of the first limiting passage.

6. The vibration-damping device according to claim 3,
wherein the flow changing protrusion further comprising:
a first flow changing protrusion in which the opening on the protruding end side faces a first liquid chamber side in the axial direction of the first limiting passage; and
a second flow changing protrusion in which the opening on the protruding end side faces a second liquid chamber side in the axial direction of the first limiting passage.

7. The vibration-damping device according to claim 1,
wherein the flow changing protrusion further comprises:
a first flow changing protrusion in which the opening on the protruding end side faces a first liquid chamber side in the axial direction of the first limiting passage;
a second flow changing protrusion in which the opening on the protruding end side faces a second liquid chamber side in the axial direction of the first limiting passage, and
wherein base ends of the first flow changing protrusion and the second flow changing protrusion are directly connected to each other.

8. The vibration-damping device according to claim 1,
wherein, in a cross-sectional view orthogonal to the axis of the first limiting passage, the flow changing protrusion consists a pair of plates, and
wherein, in a cross-sectional view orthogonal to the axis of the first limiting passage, one of the pair of the plates is disposed on the opposite side of the other of the pair of the plates with respect to the axis of the first limiting passage.

9. The vibration-damping device according to claim 1,
wherein, in a vertical cross-sectional view passing through an axis of the first limiting passage and through the flow changing protrusion, the flow changing protrusion forms a triangular shape.

10. The vibration-damping device according to claim 1,
wherein, in a vertical cross-sectional view passing through an axis of the first limiting passage and through the flow changing protrusion, the flow changing protrusion forms a trapezoidal shape.

11. The vibration-damping device according to claim 1,
wherein, in a vertical cross-sectional view passing through an axis of the first limiting passage and through the flow changing protrusion, the flow changing protrusion further comprises a first flow changing protrusion and a second flow changing protrusion,
wherein, in a vertical cross-sectional view passing through an axis of the first limiting passage and through the flow changing protrusion, an intermediate part is formed between the first flow changing protrusion and the second flow changing protrusion in the axial direction of the first limiting passage, and
wherein, in a cross-sectional view perpendicular to the axis of the first limiting passage, the intermediate part has a greater cross-sectional area formed by the inner peripheral surface of the first limiting passage than the cross-sectional area of the passage hole formed by the protruding end of each of the first flow changing protrusion and the second flow changing protrusion.

12. The vibration-damping device according to claim 1, wherein, in a vertical cross-sectional view passing through an axis of the first limiting passage and through the flow changing protrusion, the flow changing protrusion comprises a first flow changing protrusion and a second flow changing protrusion,
wherein, in the first limiting passage, the first flow changing protrusion is disposed closer to the first liquid chamber than the second flow changing protrusion, and
wherein, in a cross-sectional view perpendicular to the axis of the first limiting passage, a cross-sectional area of the passage hole of the first flow changing protrusion is greater than a cross-sectional area of the passage hole of the second flow changing protrusion.

13. The vibration-damping device according to claim 1, wherein the axis of the first limiting passage extends in a perpendicular direction to an axis of the first attachment member.

14. A vibration-damping device comprising:
a tubular first attachment member coupled to any one of a vibration generating part and a vibration receiving part, and a second attachment member coupled to the other thereof;
an elastic body configured to couple the first attachment member and the second attachment member together; and
a partitioning member that partitions a liquid chamber within the first attachment member having a liquid enclosed therein into a first liquid chamber and a second liquid chamber,
wherein at least one of the first liquid chamber and the second liquid chamber has the elastic body on a portion of a wall surface thereof,
wherein a limiting passage that allows the first liquid chamber and the second liquid chamber to communicate with each other is formed in the partitioning member,
wherein the limiting passage includes a first limiting passage that causes resonance with respect to the input of an idle vibration, and a second limiting passage that causes resonance with respect to the input of a shake vibration,
wherein an inner peripheral surface of the first limiting passage is provided with a flow changing protrusion that protrudes toward an inner side in a radial direction of the first limiting passage and that changes the flow of a liquid that flows through the first limiting passage in an axial direction of the first limiting passage,
wherein, in a vertical cross-sectional view passing through an axis of the first limiting passage and through the flow changing protrusion, the first limiting passage and the flow changing protrusion have symmetrical shapes with respect to the axis of the first limiting passage,
wherein a protruding end of the flow changing protrusion forms an inner peripheral edge of a passage hole that is open on both sides in the axial direction of the first limiting passage,
wherein the flow changing protrusion partitions the first limiting passage into a flow changing space that is formed between the flow changing protrusion and an inner peripheral surface of the first limiting passage and changes the flow of the liquid flowing thereinto, and a passage space that has the passage hole and allows the liquid flowing thereinto to pass therethrough,
wherein the flow changing space is formed between an outer peripheral surface of the flow changing protrusion and an inner peripheral surface of the first limiting passage,
wherein the passage space is formed by an inner peripheral surface of the flow changing protrusion, and
wherein, in a cross-sectional view perpendicular to the axis of the first limiting passage, a cross-sectional area formed by the outer peripheral surface of the flow changing protrusion gradually decreases from a base end toward a protruding end.

15. The vibration-damping device according to claim 14, wherein, in a cross-sectional view perpendicular to the axis of the first limiting passage, the passage hole is formed in a tubular shape.

16. The vibration-damping device according to claim 14, wherein, in a cross-sectional view perpendicular to the axis of the first limiting passage, the passage hole is formed in a plate shape.

17. The vibration-damping device according to claim 14, wherein the flow changing protrusion further comprises:
a first flow changing protrusion in which the opening on the protruding end side faces a first liquid chamber side in the axial direction of the first limiting passage; and
a second flow changing protrusion in which the opening on the protruding end side faces a second liquid chamber side in the axial direction of the first limiting passage.

18. The vibration-damping device according to claim 14, wherein the flow changing protrusion consists of a single first flow changing protrusion and a single second flow changing protrusion,
wherein the first flow changing protrusion in which the opening on the protruding end side faces a first liquid chamber side in the axial direction of the first limiting passage; and
wherein the second flow changing protrusion in which the opening on the protruding end side faces a second liquid chamber side in the axial direction of the first limiting passage.

19. The vibration-damping device according to claim 14, wherein the axis of the first limiting passage extends in a perpendicular direction to an axis of the first attachment member.

20. The vibration-damping device according to claim 14, wherein the axis of the first limiting passage is overlapped with the passage hole formed by the protruding end of the flow changing protrusion.

* * * * *